June 20, 1967 S. G. LEVINE 3,326,571
FOLD AWAY UTILITY CART
Filed April 22, 1965

INVENTOR
SHIRLEY G. LEVINE

BY Garvey & Garvey
ATTORNEYS

United States Patent Office 3,326,571
Patented June 20, 1967

3,326,571
FOLD AWAY UTILITY CART
Shirley G. Levine, Silver Spring, Md.
(3900 16th St. NW., Washington, D.C. 20011)
Filed Apr. 22, 1965, Ser. No. 449,949
2 Claims. (Cl. 280—41)

The present invention is a fold away utility cart having for an object to provide a compact, lightweight cart conveniently maneuverable for use in self-service stores, as well as for transporting articles of various miscellany, on conventional pavements, where it is necessary to elevate a terminal of the loaded cart at each street intersection, to clear the curbstones of the pavements.

Other objects of the invention are to provide a cart comprising a skeleton frame composed of a back and pivotally connected base, the latter equipped with rear wheels of equal diameter and a front wheel which is of much smaller diameter directly connected to the front of the base, midway the sides of the latter, to permit elevation of the front of the loaded cart, with facility and a minimum displacement of the articles being transported; to connect the back and base of the cart by an elevating assembly engaged to the back and base, at strategic points, to permit the base to be folded against the back, after the cart is unloaded, by a pedal bar forming a part of the assembly; to provide a cart, the back of which includes cross bars positioned in different places and adapted to support baskets or other selected article-carrying receptacles, for a more equal distribution of the load carried by the cart; and to provide a utility cart of the character described wherein the article-carrying receptacles are detachably connected to the frame to permit stacking of bulky articles directly on the frame.

A further object of the invention is to provide a fold-away cart including a back and base, one end of the base being open and equipped with a pair of wheels of equal diameter, the opposite end of the base being closed and arched upwardly, midway the sides of the base for the reception of a front wheel assembly, the wheel of the assembly being much smaller than the rear wheels of the base, to facilitate elevating and lowering the front end of the cart when clearing curbs at street intersections, the upwardly arched part of the closed end providing an abutment to prevent a receptacle, mounted on the top of the base, from sliding off.

Other objects of the invention will be manifest from the following description of the present preferred form of the invention taken in connection with the accompanying drawings, wherein.

Figure 1:
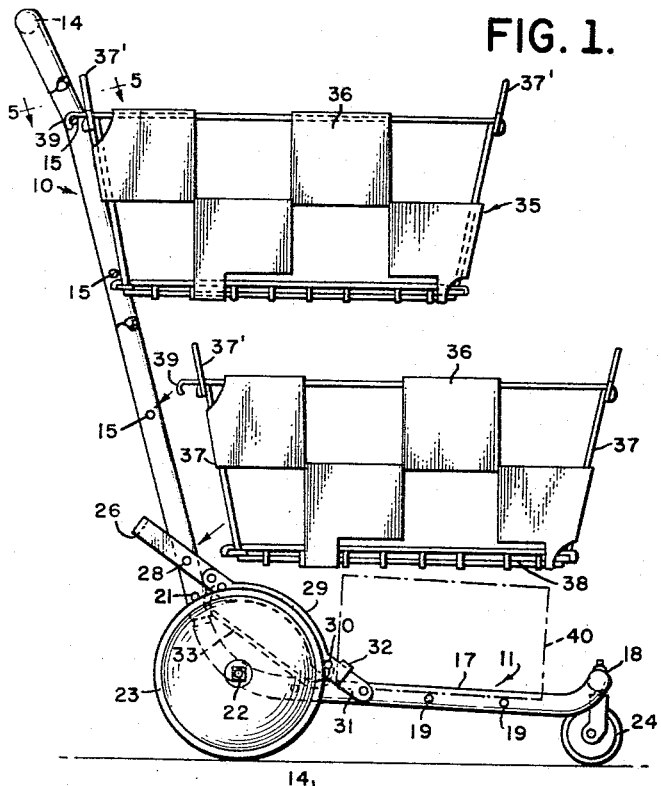
FIG. 1 is a side elevational view of a cart constructed in accordance with this invention, illustrating its application.
Figure 2:
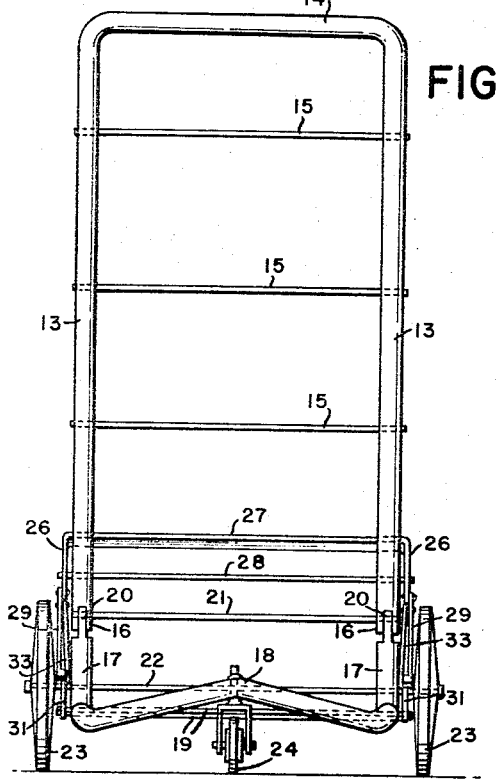
FIG. 2 is a front elevational view of the cart when unloaded.

Referring now in greater detail to the drawing, the cart of the present invention comprises a back 10 and a base 11, hingedly connected at 12 to permit collapsing. As shown in FIGS. 1 and 2, back 10 includes an inverted substantially U-shaped frame having spaced parallel leg portions 13 joined at their upper ends by a transverse portion 14 forming the handle of the cart. At predetermined points along their lengths, leg portions 13 are connected by spaced parallel supporting rods or bars 15, the function of which will be hereinafter more fully set out. The lower extremities of leg portions 13 are bifurcated at 16 to facilitate hinged engagement with base 11.

Base 11 also includes a substantially U-shaped frame having spaced parallel leg portions 17 joined at the front end of the cart by transverse member 18 which, as shown in FIG. 2, angles upwardly from each leg portion to form an arched abutment. A plurality of spaced parallel bars 19 connect leg portions 17 at various points along their lengths. The free terminals of leg portions 17 are provided at one end with reduced central extensions 20 adapted for reception in the bifurcated portions 16 of back leg portions 13. A connecting rod 21 extends transversely of the cart at the locus of the juncture of back 10 and base 11, which connecting rod passes through openings in bifurcated terminals 16 of leg portions 13 and extensions 20 of leg portions 17, to form a pivotal connection between the back and base, permitting relative rotational movement between the same.

In order to permit rolling of the cart from place to place, it is within the contemplation of the present invention to provide an axle rod 22 which extends between leg portions 17 near the aft end of base 11 to the terminals of which axle rod are suitably mounted rear wheels 23. A conventional swivel wheel assembly 24 depends from the apex of arched transverse member 18, centrally of the latter, to support the front end of the cart and permit dirigibility thereof. For optimum results, it is preferable that the diameter of rear wheels 23 be approximately nine inches, and the diameter of forewheel 24 be approximately three inches. The loading surface of the base 11 in the front end is also approximately three inches above the surface on which the cart rests. Consequently in many instances it is possible to slide the load onto the cart from the surface on which the cart is positioned, without lifting the load in its entirety and positioning it on the base. Furthermore, the arch of transverse member 18 provides an abutment to prevent the load from sliding forward and as shown in FIG. 1, the base does not lie in a horizontal plane, but is inclined slightly downwardly from the aft end to the front end thereof, to prevent rearward movement of the load.

For facilitating the folding of the cart, for storage when not in use, there is provided a hoist mechanism generally designated 25. This mechanism includes a foot-engaging U-shaped pedal bar including leg portions 26, the aft terminals of which are joined by a transverse foot bar 27. Intermediate their lengths, leg portions 26 are pivoted to leg portions 13 of back 10 by a combination support and pivot rod 28. The forward free terminals of leg portions 26 are fixedly engaged with the terminals of arched connecting bars 29, the opposite ends of which are pivotally engaged at 30, with links 31 extending from arched connecting bars 29 into pivotal engagement with an intermediate portion of leg portions 17 of base 11. The outer ends of bars 25 are provided with lateral extensions 32 which serve as latches or stops to limit movement of links 31. Resilient elements 33, such as springs are fixed at 34 to arched connecting bars 29, the opposite ends of said springs being rotatably mounted on pivot members 30. These resilient elements serve to maintain the cart in the collapsed position shown in FIGS. 3 and 4 during storage, the tension of the springs being overcome when the base is manually lowered to operative position. The pivotal movement of links 31 into the position shown in FIGS. 1 and 2 serve to maintain the base in the operative position against the tension of springs 33.

In accordance with the present invention, baskets 35, made of wire or any other suitable construction, are adapted to be connected to back 10 of the cart. These baskets may be of the collapsing, folding, or nesting type, including vertical side members 36, inclined end members 37 and a bottom 38. It will be noted from FIG. 1 that the upper transverse portions of sides 36 are extended rearwardly to provide hooks 39 adapted for engagement with a selected support bar 15 to hold the basket in engagement with back 10. It will also be seen from FIG. 1, that the lower portion of inclined end wall 37 engages a support rod 15 so that basket 35 is maintained in a substantially horizontal plane while connected to back 10. Attention is further called to the fact that back 10 is slightly inclined rearwardly from the lower to the upper portion thereof, which inclination, in conjunction with the inclined end walls of the basket 35, enable the baskets to be supported in a horizontal plane.

It will be noted that providing the two point support of baskets 35 at the locus of back 10, no additional basket supporting bases or arms are necessary. By provision of hooks 39, baskets 35 may be readily engaged with, and disengaged from back 10, as required. It will also be noted from FIG. 1 that when baskets 35 are engaged with back 10, they do not lie in the same vertical plane, thereby facilitating placement of articles in the front of the lower basket. Bars 19 of base 11 may be utilized to support bulky articles such as indicated at 40. Removal of baskets 35 is facilitated by handles 37' issuing from the upper central portion of end walls 37.

By virtue of the versatile nature of the cart of the present invention, when it is desirable to transport large bulky items which may not readily be placed in baskets 35, the baskets may be removed and the items placed directly on the base, in the manner of article 40 shown in FIG. 1, or may be arranged in such a manner that a portion thereof is inclined rearwardly into engagement with rods 15 in the manner of a hand truck.

By virtue of the wheeled arrangement of the present invention, movement of the cart from place to place is readily effected and the reduced size of front wheel 24 facilitates the ascent and descent of curbs or other abrupt changes in the level of the surface on which the cart moves.

Figure 4:
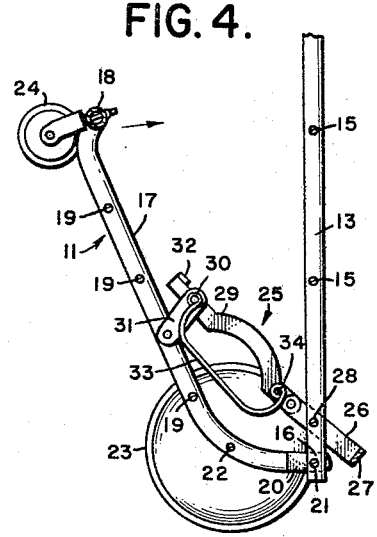
FIG. 4 is a fragmentary longitudinal sectional view of the cart of the present invention in the collapsed position.
Figure 3:
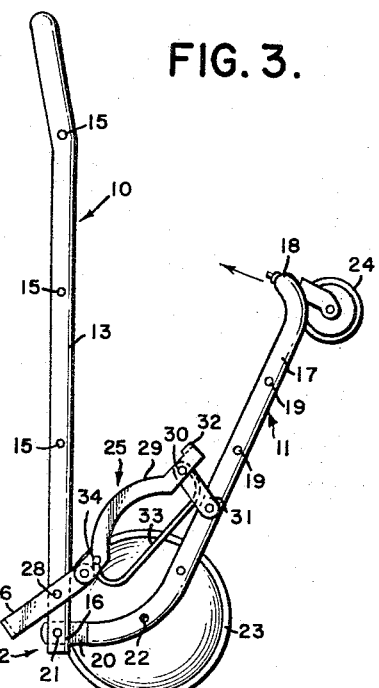
FIG. 3 is a side elevational view of the cart when in partly collapsed position, a rear wheel being removed to disclose details of construction.
Figure 5:
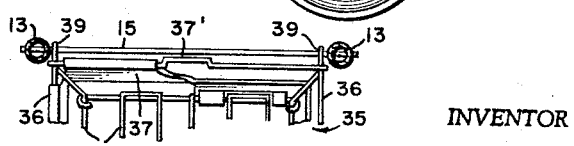
FIG. 5 is a sectional view taken along the lines 5—5 of FIG. 1, looking in the direction of the arrows and showing to advantage the manner of engaging a basket with the back of the present cart.

After the cart has been unloaded and it is desired to fold the same into a closed position for storage, the foot is pressed against pedal bar 27, causing pivotal movement of the links with respect to leg portions 17 of base 11 and arched connecting bars 29 to effect movement of the base in an arc as shown in FIGS. 3 and 4, the cart being retained in this postiion under tension exerted by springs 33.

While there has been herein shown and described a preferred embodiment of the invention, it is nevertheless to be understood that various changes may be made therein, without departing from the scope of the claims hereto appended.

I claim:
1. A fold away utility cart including a back and a base hingedly connected together, said back comprising an inverted, substantially U-shaped frame extending upwardly and rearwardly and having leg portions joined at one end by a transverse portion to form a handle, a plurality of support bars positioned between, and lying in substantially the same plane as, said leg portions, said support bars lying in predetermined, spaced relationship, said base portion including a U-shaped frame, a plurality of support bars positioned between said base leg portions, wheel members mounted on said U-shaped base frame, a hoist mechanism operatively connected to said back and base to effect collapsing of the cart, said hoist mechanism including a foot-engaging U-shaped pedal bar comprising leg portions, a transverse foot bar joining the left terminals of said leg portions, the leg portions of said pedal bar being pivoted intermediate their lengths to the leg portions of said back, the hoist mechanism further including arched connecting bars fixed to the free terminals of said hoist mechanism leg portions, links pivotally connecting said hoist mechanism to said base, a spring extending from a terminal of each arched connecting bar to the point of pivotal connection with each link, to retain said base and back in collapsed condition, and a basket for detachable engagement with said back, said basket having sides and a bottom, hooks extending outwardly from one side of said basket for engagement with one of said back support bars, the lower portion of the side having the hooks connected thereto being in abutting engagement with a second back support bar to maintain said basket in a substantially horizontal plane.

2. The utility cart of claim 1, wherein said base comprises a substantially U-shaped frame having spaced leg portions connected by a transverse portion, the transverse portion being located at the front of the cart and angling upwardly from each leg portion to a point centrally of the latter, thereby forming an arched abutment, rear wheel members rotatably mounted on the base leg portions adjacent the point of connection of said back and base, and a single swivel wheel rotatably mounted in the forward transverse portion of said base and depending from the apex of the arched abutment formed thereby.

References Cited
UNITED STATES PATENTS

| | | | |
|---|---|---|---|
| 2,133,834 | 10/1938 | Sheldon | 280—47.35 |
| 2,212,053 | 8/1940 | Smith | 280—36 |
| 2,807,513 | 9/1957 | Stein | 211—88 |
| 2,831,598 | 4/1958 | Slavsky et al. | 211—88 |
| 2,901,262 | 8/1959 | Berlin | 280—41 |

FOREIGN PATENTS

| | | |
|---|---|---|
| 1,163,199 | 9/1958 | France. |
| 661,981 | 11/1951 | Great Britain. |

BENJAMIN HERSH, *Primary Examiner.*

M. S. SALES, L. D. MORRIS, *Assistant Examiners.*